Figure 1:
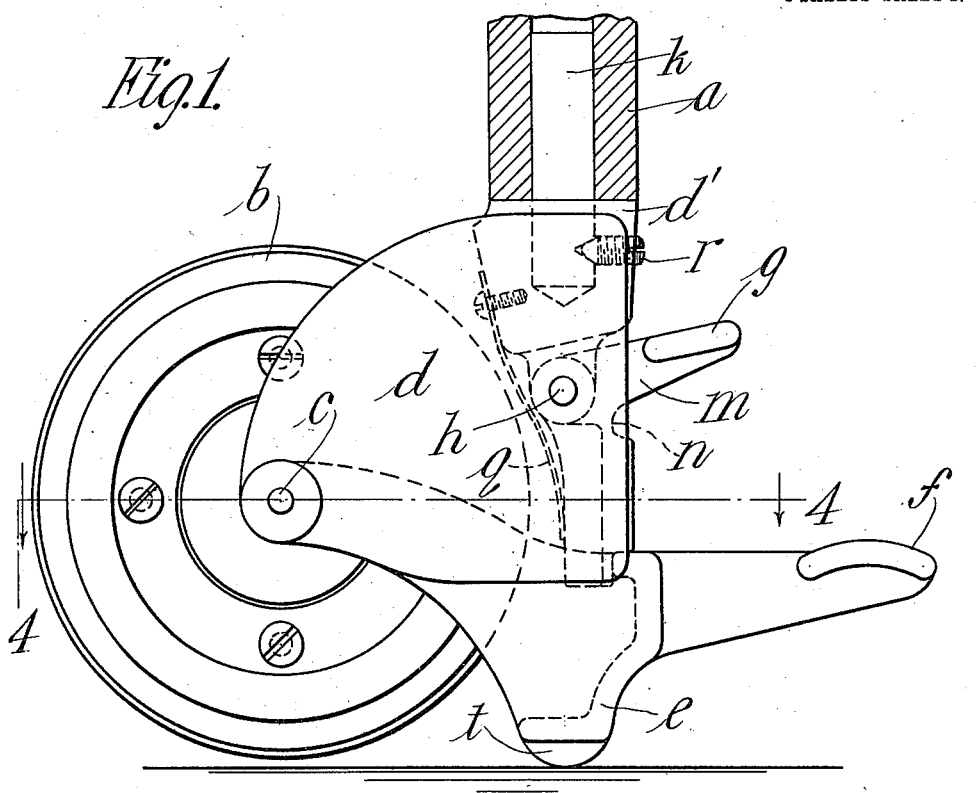

W. J. OLDROYD.
CASTER DEVICE.
APPLICATION FILED JAN. 24, 1914.

1,092,506.

Patented Apr. 7, 1914.
4 SHEETS—SHEET 1.

Witnesses:
H. E. Hartwell.
Caroline N. Willis.

Inventor:
Walter J. Oldroyd.
By Chapin & Co.
Attorney.

W. J. OLDROYD.
CASTER DEVICE.
APPLICATION FILED JAN. 24, 1914.
1,092,506.
Patented Apr. 7, 1914.
4 SHEETS—SHEET 2.
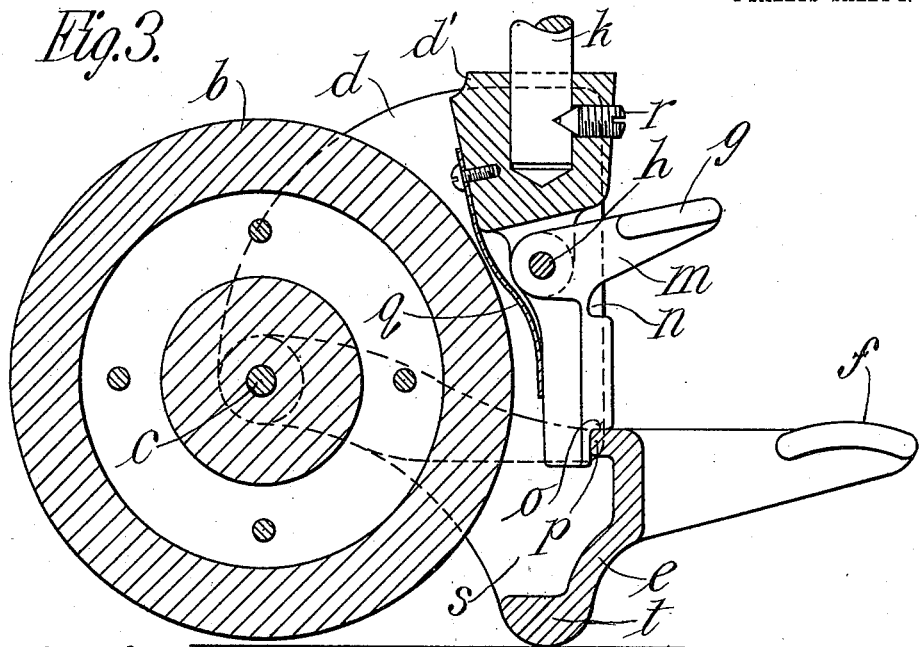
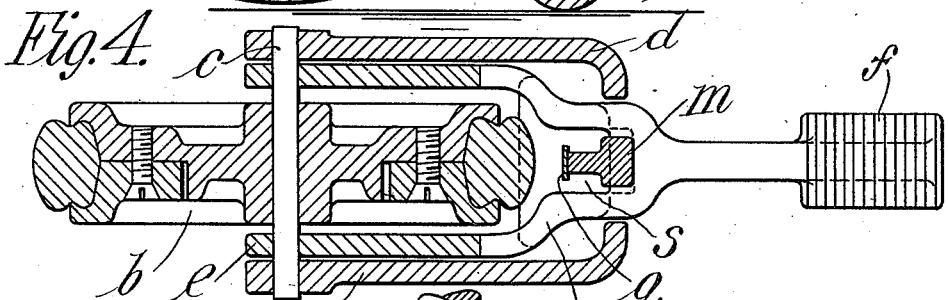
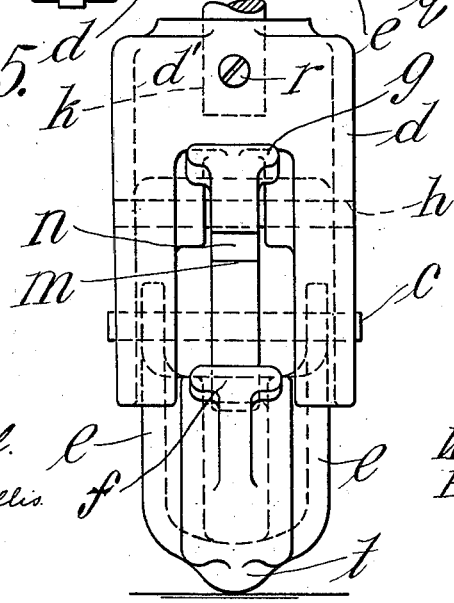
Witnesses:
Inventor:
Walter J. Oldroyd.
By Chapin & Co.
Attorney.

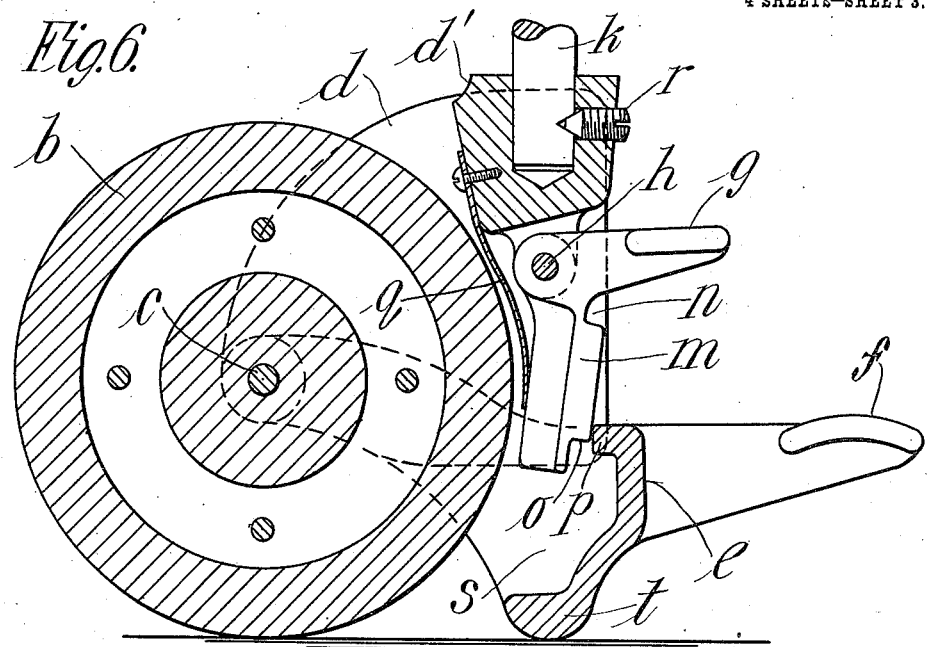
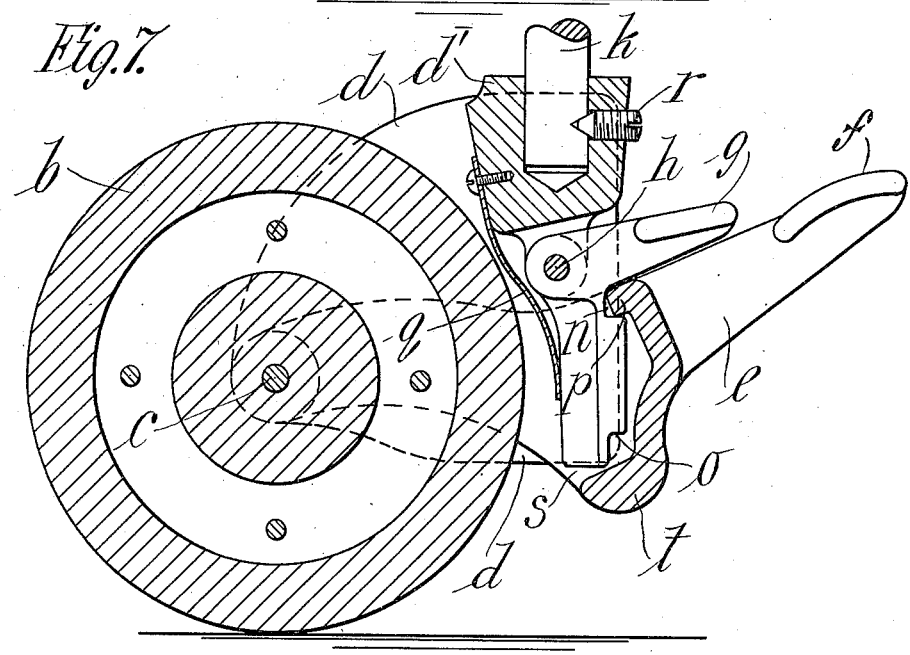

W. J. OLDROYD.
CASTER DEVICE.
APPLICATION FILED JAN. 24, 1914.

1,092,506.

Patented Apr. 7, 1914.
4 SHEETS—SHEET 4.

Witnesses:
H. E. Hartwell.
Caroline N. Willis.

Inventor:
Walter J. Oldroyd.
By Chapin & Co.
Attorney.

UNITED STATES PATENT OFFICE.

WALTER J. OLDROYD, OF HARTFORD, CONNECTICUT, ASSIGNOR TO GEORGE P. CLARK COMPANY, OF WINDSOR LOCKS, CONNECTICUT, A CORPORATION OF CONNECTICUT.

CASTER DEVICE.

1,092,506.  Specification of Letters Patent.  Patented Apr. 7, 1914.

Application filed January 24, 1914. Serial No. 814,092.

*To all whom it may concern:*

Be it known that I, WALTER J. OLDROYD, a citizen of the United States of America, residing at Hartford, in the county of Hartford and State of Connecticut, have invented new and useful Improvements in Caster Devices, of which the following is a specification.

This invention relates to an improved caster device.

The caster embodying this invention is designed to provide a structure in which the part supported by the caster, such as a bed, may be supported by the wheel of the caster when desired, and, by manipulating the improved caster device, the weight of the bed may be supported independently of the wheel by a part of the device resting directly on the floor. Such a caster is useful in hospitals particularly where it is desired to move a bed supported by casters from one point to another. Where the wheels of the casters are free to rotate at all times, a person is liable to lean against the bed and have the bed roll away on the casters and cause him to lose his balance and fall to the floor. By providing the caster device of the kind described, the bed may be supported by the caster wheels and rolled to the desired point at which point each caster device is operated to throw the weight of the bed off of the caster wheel and directly on a part of the device which will prevent the bed from rolling. This latter part may be provided with suitable material to prevent slipping and injury to the floor. The use of the device as a whole will lengthen the life of the caster wheels, especially those provided with rubber treads, for the weight is on the rubber only for a small fraction of the time the caster is in use.

The object of the invention is to provide a caster frame in combination with a support having an integral operating member therefor pivoted to the frame which may move to two positions in one of which the caster wheel may have its usual function and, in the other, the caster wheel may be elevated and the support act in place of the caster wheel.

A further object of the invention is to provide in combination with a caster frame a support pivoted to swing thereon, having a part to engage the floor as a fulcrum and an integral extension from the fulcrum point for operating the support.

A further object of the invention is to provide in combination with a caster frame a support pivoted to swing thereon, having a foot-operated part to engage the floor as a fulcrum and lift the frame, together with a latch device operated by said part for holding the caster in the desired position.

A still further object of the invention is to simplify and improve the construction of caster devices of the described class, all as will appear in the following specification.

Figure 2:
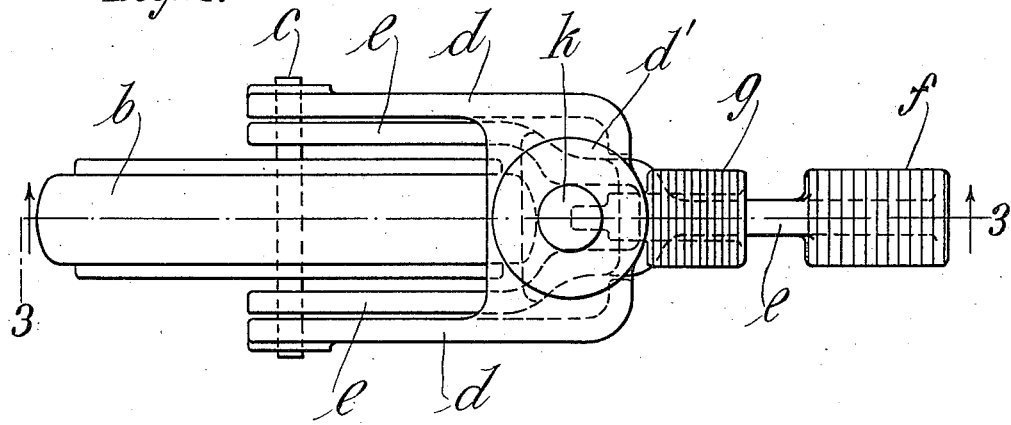
Figure 8:
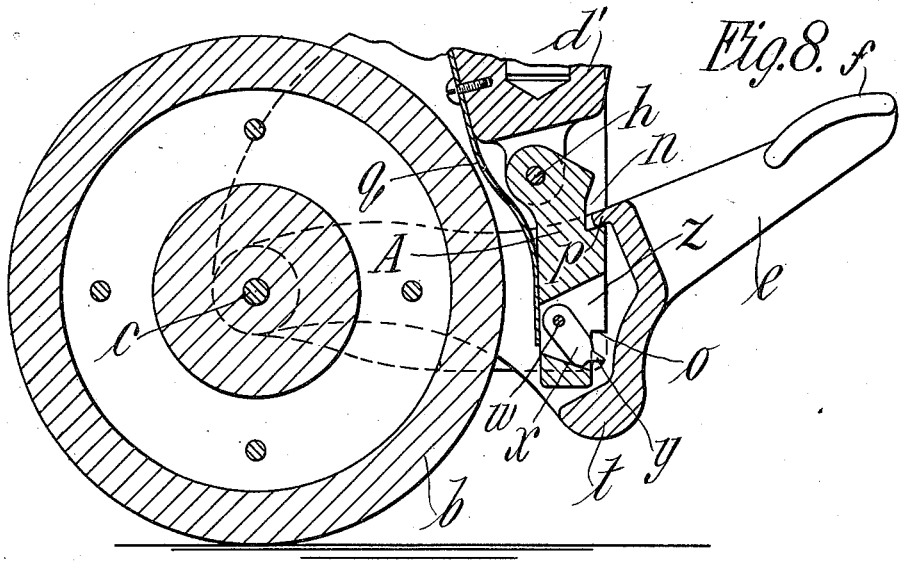
Figure 9:
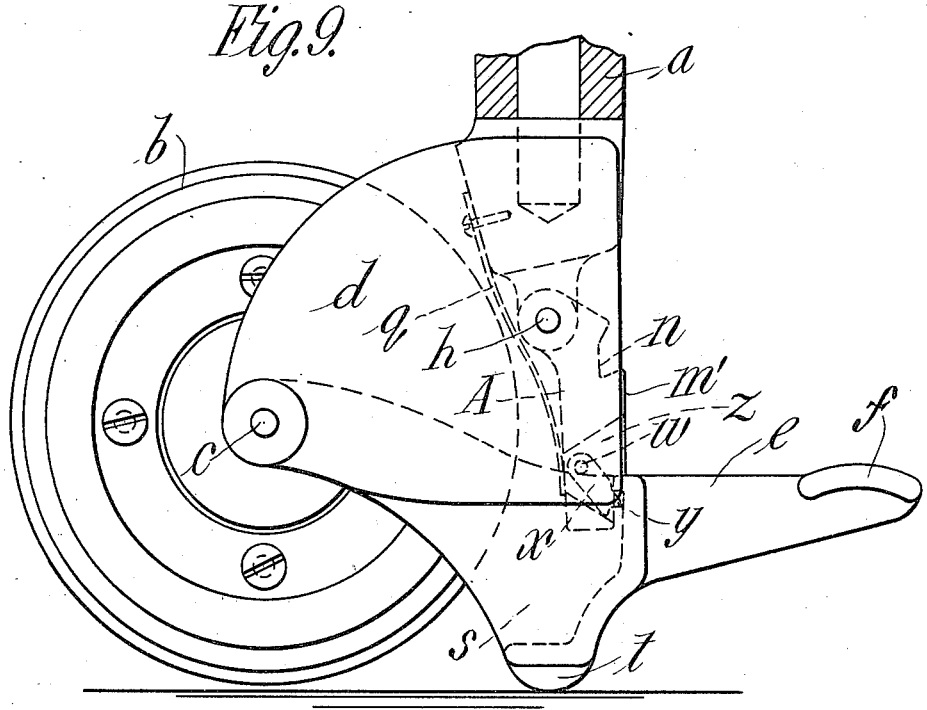

In the accompanying drawings Figure 1 is a side elevational view of my caster device shown with the wheel in an elevated position; Fig. 2 is a plan view thereof; Fig. 3 is a sectional elevation taken on the line 3—3 of Fig. 2 and looking in the direction of the arrows; Fig. 4 is a sectional plan view taken on the line 4—4 of Fig. 1 and looking in the direction of the arrows; Fig. 5 is an end elevational view of Fig. 1; Fig. 6 is a sectional view similar to Fig. 3 showing the wheel in a lowered position. Fig. 7 is a sectional view, also similar to Fig. 3, showing the wheel in a lowered position and the supporting and elevating device removed from the floor; Fig. 8 is a sectional detail view showing a different form of latch device from that indicated in the other views; and Fig. 9 is a side elevation indicating the latch device by dotted lines in a different position than shown in Fig. 8.

Referring to Fig. 6: The invention comprises a caster device including a caster frame $d$ made in two side members, as indicated in Fig. 5, joined at the top by a boss $d'$ and having mounted therein at one corner the axle $c$ for the caster wheel $b$. The construction of the caster wheel $b$ is indicated in Fig. 4 and includes a rubber tread. At the lower end of the boss $d'$ are two depending lugs in the space between the side members of the frame $d$ (see Figs. 3 and 6). A bell-crank-lever $m$ is pivoted at $h$ for pivotal support from these lugs. Pressing against the lower arm of the lever $m$ is a spring $q$ fastened at one end to the boss $d'$ to turn the lever $m$ on its pivot counter-clockwise. Pivoted on the axle $c$ of the caster wheel is an elevating and supporting lever $e$ having intermediate its ends a depending extension $t$ to engage the floor when the lever is used for elevating purposes. A pin $k$ fits in a recess at the upper end of the boss $d'$ and is held therein by means of a set screw $r$. The pin $k$ is designed to enter a recess in the foot of a bed leg or other device to be supported by the caster $a$.

The operation of my device is as follows: Referring to Figs. 6 and 7, it will be noticed that the caster wheel $b$ rests on the floor. If the parts remain in this position, the weight of the body supported by the legs $a$ is acting through the wheel $b$. With the parts in the position stated, the supported body may be rolled along the floor to any desired point. In order to prevent the supported body from moving after it has been placed in proper position, the operator presses his foot against the treadle $f$ of the elevating member $e$ (Fig. 7). The lug $p$ of the member $e$ is designed to engage a latch portion $n$ of the lever $m$ when the member $e$ is out of commission. The downward movement of the member $e$ swings the lever $m$ clockwise against the action of the spring $q$ to release the lug $p$ from engagement with the latch portion. This is possible because the lever $m$ and the member $e$ are pivoted on different centers and designed to allow the releasing movement mentioned. The member $e$ is thus locked in lowered position. The continued pressure upon the treadle $f$ will cause the part $t$ of lever $e$ to press against the floor and, with the floor as a fulcrum, swing the axle $c$, the caster frame, and the parts connected therewith, upwardly. This operation causes the wheel $b$ to be raised from the floor and the entire weight of the supporting device and the parts supported thereby to act directly on the floor vertically (without any transmission of force tending to strain the parts) through the boss $d'$, lever $m$, and portion $t$ of the supporting member $e$. The supporting member $e$ is held in the position in which it is moved to raise the parts by means of the lever $m$ when the spring $q$ acts to turn the lower shoulder $o$ immediately above the lug $p$.

The normal position of the caster device is the position just described for the parts and is best shown in Fig. 3. When it is desired to lower the caster wheel so that the device may act as a rolling support, the operator presses his foot on the treadle $g$ of lever $m$ which causes the shoulder $o$ to move away from the lug $p$ and release the supporting member $e$. This allows the caster frame and the device supported thereby to swing on the fulcrum $t$ to the position shown for the parts in Fig. 6. In order to get the supporting device $e$ out of the way when it is not in use, it may be elevated until the lug $p$ engages the recess $n$ of the lever $m$ which acts together with the spring $q$ as a latch to hold member $e$ in "out of the way" position as shown in Fig. 7.

The construction of the member $e$ is best shown in Figs. 3 and 4 and comprises a shank portion on the right at the end of which the treadle $f$ is provided and forked portions at the left to span the caster wheel $b$ and engage the axle $c$ near its ends. Side plates of the caster frame $d$ are designed to act as coverings for the forked members of the device $e$ as well as a covering for the the spring $q$ and the greater portion of the bell-crank-lever $m$. The shank portion of the member $e$ extends through an open end vertical slot extending from the boss $d'$ to the lower end of the caster frame. The particular design shown in the drawings, while, of course, not absolutely essential to the operation of the device, is of considerable advantage because it provides a neat arrangement of the elements.

The caster device as shown in Figs. 8 and 9 embodies a different latch device than that embodied in the lever $m$ as shown in the other figures. The parts in these figures, where they correspond exactly to the parts as shown in the other figures, are indicated by the same reference characters. The supporting or elevating device $e$ is made in the same manner as indicated in Figs. 1 to 7 and described above. The latch device A, however, is so designed that it is operated by means of the movements of the lever $e$, and the foot-treadle $g$ provided on the lever $m$ as indicated in Fig. 6, is not necessary in the latch device A. Referring to Fig. 8, the lever $e$ by the lug $p$ is supported in "out of the way" position by means of the shoulder $n$. If, with the parts as shown in Fig. 8, the operator presses his foot against the treadle $f$, the latch A will swing clockwise so that the lug $p$ will be released. The depending portion $t$ of lever $e$ will come to rest against the floor, and continued pressure on the treadle $f$ will raise the caster device as already described. When the lever $e$ has been lowered far enough for the shoulder $o$ to pass over the top of lug $p$, being moved thereover by means of the spring $q$, the parts will be locked, and the caster device will function the same as already described in connection with Fig. 3. If now it is desired to release the lever $e$ and allow the wheel to support the weight, the operator presses his foot on the treadle $f$ until the top of the lug $p$ is swung below the cam surface $y$ on the lower outer end of the dog $x$ pivoted at $w$ in a suitable slot $z$ provided at the lower end of the latch A. If the operator then removes his foot from the treadle $f$, the weight of the parts will swing the lever $e$ counterclockwise, and, in this movement, the top of the lug $p$ bearing against the cam surface $y$ of the dog $x$ will ride by the shoulder $o$ without engaging the shoulder. At the same time, the latch $a$ will be swung to the left through the dog $x$ and its pivotal connection $w$. This allows the lug $p$ to clear the shoulder $o$ and the parts of the caster device to be lowered into the position shown in Fig. 8. The lever $e$ may then be raised and engaged by the shoulder $n$. In this position, the device may be used as the ordinary caster device is.

The invention has been shown in one of its preferred forms. It may, if desired, be embodied in many other forms having the same general combinations as hereinafter claimed.

Referring to Figs. 3 and 9, it will be noticed that the caster device, except where it is being used as a rolling support, is designed to have the weight of the body supported thereby act through the caster device to put the parts under substantially direct compression. The ordinary caster device and the elevating caster devices heretofore used are constructed in such a manner that undesirable strains are placed on the parts. By the arrangement herein described, the normal supporting parts are put under a direct compression. The parts can, therefore, be made lighter which is a distinct advantage.

What I claim is:—

1. In combination, a caster frame, means for raising the frame, comprising, a lever pivoted thereto, said lever having a depending portion to engage the floor and an extended portion to swing the lever on the floor as a fulcrum.

2. In combination, a caster frame, means for raising the frame, comprising, a lever pivoted thereto, said lever having a depending portion to engage the floor and an extended portion to swing the lever on the floor as a fulcrum, together with a device to lock the frame in raised position.

3. In combination, a caster frame, a wheel and a lever for raising the frame pivoted thereto, said frame being constructed to receive a body to be supported thereby at a point one side of the wheel axis, said lever having a portion to engage the floor immediately below said point, and an extended portion operable to swing the lever with the floor as a fulcrum to raise the frame.

4. In combination, a caster frame, a wheel and a lever for raising the frame pivoted thereto, said frame being constructed to receive a body to be supported thereby at a point one side of the wheel axis, said lever having a portion to engage the floor immediately below said point, and an extended portion operable to swing the lever with the floor as a fulcrum to raise the frame, together with means arranged to act in substantially the vertical line through said point to lock the frame.

5. In combination, a caster frame, a wheel and a lever for raising the frame pivoted thereto, a depending portion on said lever to engage the floor, an extended portion on the lever operable to swing the lever to raise the frame, a latch device operable to hold the lever in position after it has raised the frame, said lever and latch device being constructed and arranged for the movement of the lever to operate the latch device.

6. In combination, a caster frame made up of two spaced plates joined at one corner by a boss, a wheel pivoted at a lower side corner of the frame to turn between the spaced plates, a forked lever pivoted on the same axis as the wheel to span the wheel between the plates, said lever extending beyond and at one side of the spaced plates and having a depending portion to engage the floor in a vertical line with said boss, a latch device for the lever arranged vertically below the boss, all constructed and arranged so that the lever may be operated to raise the frame from the floor as a fulcrum and the latch hold the parts in raised position with the weight of any part supported by the boss transmitted vertically through the frame, the latch and the depending portion of the lever to put the parts under direct compression.

7. In combination, a caster frame, a wheel pivoted at a lower side corner of the frame, a weight-supporting portion at a diagonal corner, a lever pivoted to the frame at said first-mentioned corner having a depending portion to engage the floor vertically below the second mentioned corner, a latch device immediately above said depending portion, all constructed and arranged for the lever to elevate the frame and the latch device to lock it in elevated position whereby the weight of a part supported by the frame will be transmitted vertically through the frame latch device and lever to the floor to put the parts under direct compression.

8. In combination, a caster, means to elevate the caster, a spring-pressed latch to lock the caster in elevated position, said latch being operable by the movement of said means to unlock the latter.

WALTER J. OLDROYD.

Witnesses:
H. E. HARTWELL,
JAMES D. OUTERSON.

Copies of this patent may be obtained for five cents each, by addressing the "Commissioner of Patents, Washington, D. C."